3,158,587
DIAMINO-PIPERAZINES AS STABILIZERS FOR ORGANIC MATERIALS

Hugh W. Stewart, Woodbury, Conn., assignor to United States Rubber Company, New York, N.Y., a corporation of New Jersey
No Drawing. Filed Oct. 20, 1960, Ser. No. 63,726
8 Claims. (Cl. 260—45.8)

This invention relates to new antioxidants for organic materials which are susceptible to deterioration by oxygen because of their chemical unsaturation, such as edible fats, oils, gasoline, etc., and especially vulcanized rubber.

It is well known that atmospheric oxygen has harmful effects on these unsaturated materials and that small quantities of antioxidants may be added thereto in order to prevent or retard their deterioration. Several types of organic chemicals, such as sterically hindered phenols, aromatic amines, and phenolic sulfides, have been used as antioxidants.

Tetraarylhydrazines have been disclosed as antioxidants and age resistors for rubber in U.S. Patent Nos. 1,741,778 and 1,784,838 to P. C. Jones, issued December 31, 1929, and December 16, 1930, respectively. U.S. Patent No. 1,793,635, issued February 24, 1931, to M. C. Reed teaches the use of 1,1-diarylhydrazines for this same purpose. Phenylhydrazine and 1,1-diphenylhydrazine have been used as antioxidants for acrolein as noted by Mouveu et al. in Compt. rend., 183, 823–826 (1926); CA 21, 736 (1927). The latter also inhibits the induction period for air oxidation of olive oil (see, e.g. Yamaguchi, J. Chem. Soc. Japan, 51, 77–90 (1930); C.A. 24, 4410 (1930).

The betaine derivatives of hydrazides and hydrazones have been claimed as antioxidants for glycerides by S. Shappiro in U.S. Patent No. 2,430,031, issued November 11, 1947.

I have found that 1,4-diaminopiperazines are antioxidants for rubber and air-oxidizable organic matter. My new antioxidants may be represented by the following formula:

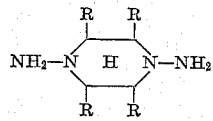

where R may be a hydrogen atom or an alkyl radical having from 1 to 4 carbon atoms. The R substituents do not have to be identical.

The rubber stock to which the antioxidants of the invention are added may be any sulfur-vulcanizable rubber which is ordinarily subject to attack by oxygen, whether natural (Hevea) rubber, or a synthetic rubber, which includes the rubber-like homopolymers of butadiene-1,3 and substituted butadienes, and rubbery copolymers of the same with aryl olefins such as styrene, with acrylic compounds such as methyl acrylate, methyl methacrylate and acrylonitrile, as well as with isobutylene, methyl vinyl ether, monovinylpyridines, vinylidene chloride, etc. Natural rubber and synthetic rubbers of the foregoing type may be designated by the general term diolefin polymer rubbers. Generally, I employ from about 1/10 to 5 parts, by weight, of the antioxidant, per 100 parts of diolefin polymer rubber.

The rubber stock may be compounded with any desired conventional vulcanizing agents, accelerators, softeners, fillers, etc. The compounded rubber stock containing my antioxidants intimately mixed therewith may be shaped and vulcanized in any desired manner in accordance with conventional practice. Standard test methods reveal in a striking manner the remarkable improvement in oxidation resistance imparted to the vulcanizate by the present chemicals.

The following examples are given to illustrate the invention.

EXAMPLE 1

The rubber stock used in the tests had the composition shown in Table I. It was cured for 15 and 30 minutes at 274° F.

Table I

| Component: | Weight, g. |
|---|---|
| Pale crepe natural rubber | 100.00 |
| XX72 Zinc oxide | 10.00 |
| Lithopone | 60.00 |
| Snowflake whiting | 60.00 |
| Laurex (zinc soap of cocoanut oil acids) | 0.50 |
| Monex (tetramethylthiuram monosulfide) | 0.15 |
| Sulfur | 3.00 |
| Test compound | 5.00 |

In Table II is shown the percent tensile strength retained after aging for 96 hrs. in oxygen at 70° C. The test was conducted according to ASTM Designation D572–53. The values given are the average values found for the samples cured for 15 and 30 minutes.

Table II

| Compound: | Percent Tensile Strength Retained |
|---|---|
| Blank | 35 |
| 1,4-diaminopiperazine | 95 |
| 1,4-diamino-trans-2,5-dimethylpiperazine | 76 |

EXAMPLE 2

1,4-diaminopiperazine was tested as a fat antioxidant in a modified Schaal oven test. Under our conditions the control or unprotected lard sample gave a peroxide number of over 30 in two days at 60° C. 1,4-diaminopiperazine at 100 p.p.m. protected the lard sample for 10 days, i.e., 10 days were required for the protected sample to attain a peroxide number of 30.

Having thus described my invention, what I claim and desire to protect by Letters Patent is:

1. A composition of matter comprising 100 parts of a chemically unsaturated organic material selected from the group consisting of sulfur-vulcanizable diolefin polymer rubber and edible fat and oil which is protected from deterioration by oxygen by the presence of from 0.1 to about 5.0 parts of an antioxidant represented by the structural formula,

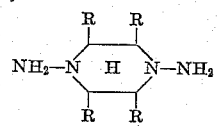

where R is selected from the group consisting of a hydrogen atom and an alkyl radical containing from 1 to 4 carbon atoms.

2. A composition of matter as in claim 1, wherein the antioxidant is 1,4-diaminopiperazine.

3. A composition of matter as in claim 1, wherein the antioxidant is 1,4-diamino-trans-2,5-dimethylpiperazine.

4. A composition of matter comprising 100 parts of a sulfur-vulcanizable diolefin polymer rubber which is protected from attack by oxygen by the presence of from 0.1 to about 5 parts of 1,4-diaminopiperazine.

5. A composition of matter as in claim 4, wherein the diolefin polymer rubber is sulfur-vulcanized natural rubber.

6. A composition of matter as in claim 4, wherein the diolefin polymer rubber is a sulfur-vulcanized copolymer of butadiene-1,3 and styrene.

7. A composition of matter as in claim 4, wherein the diolefin polymer rubber is a sulfur-vulcanized copolymer of butadiene-1,3-acrylonitrile.

8. A composition of matter comprising 100 parts of edible fat which is protected from attack by oxygen by the presence of from 0.1 to about 5 parts of 1,4-diaminopiperazine.

References Cited by the Examiner
UNITED STATES PATENTS 2,663,706 12/53 Conroy _____ 260—268
2,742,349 4/56 McCoy _____ 44—63

LEON J. BERCOVITZ, Primary Examiner.

A. D. SULLIVAN, MILTON STERMAN, Examiners.